United States Patent [19]
Zaitsu

[11] Patent Number: 5,768,111
[45] Date of Patent: Jun. 16, 1998

[54] CONVERTER COMPRISING A PIEZOELECTRIC TRANSFORMER AND A SWITCHING STAGE OF A RESONANT FREQUENCY DIFFERENT FROM THAT OF THE TRANSFORMER

[75] Inventor: Toshiyuki Zaitsu, Tokyo, Japan

[73] Assignee: NEC Corporation, Tokyo, Japan

[21] Appl. No.: 605,491

[22] Filed: Feb. 26, 1996

[30] Foreign Application Priority Data

Feb. 27, 1995 [JP] Japan ................. 7-038232

[51] Int. Cl.$^6$ ......................... H02M 3/335; H01L 41/08
[52] U.S. Cl. .................. 363/15; 363/16; 363/95; 310/316; 310/318
[58] Field of Search .................. 363/15, 16, 17, 363/132, 95, 98, 131; 310/316, 318, 319

[56] References Cited

U.S. PATENT DOCUMENTS

| | | | |
|---|---|---|---|
| 3,683,210 | 8/1972 | Kawada | 310/318 |
| 3,796,897 | 3/1974 | Sakurai | 310/319 |
| 4,054,806 | 10/1977 | Moriki et al. | 310/318 |
| 5,065,301 | 11/1991 | Shioya et al. | 363/17 |
| 5,118,982 | 6/1992 | Inoue et al. | 310/366 |
| 5,329,200 | 7/1994 | Zaitsu | 310/316 |
| 5,438,497 | 8/1995 | Jain | 363/17 |

OTHER PUBLICATIONS

Toshiyuki Zaitsu, et al. "2MHz Power Converter with Piezoelectric Ceramic Transformer", pp. 430–436, 1992.
Toshiyuki Zaitsu, et al. "Piezoelectric Transformer Operating in Thickness Extensional Vibration and Its Application to Switching Converter", pp. 585–589, 1994.

Primary Examiner—Adolf Berhane
Attorney, Agent, or Firm—Scully, Scott, Murphy & Presser

[57] ABSTRACT

In a DC—DC converter comprising a piezoelectric transformer (25) having an input capacitance between a pair of transformer input terminals and a transformer resonant frequency, an input switching stage (27) responsive to a DC input signal for supplying a sinusoidal transformer input signal, and an output rectifier stage (29) for producing a converter output voltage across a load resistor (23), the switching stage includes an input series inductor (39) connected in series to one of the transformer input terminals and having an input series inductance that defines a switching resonant frequency in cooperation with the input capacitance to be different from the transformer resonant frequency. It is preferred when the switching stage is operable in zero volt switching that the input series inductance be either between 1.0 and 2.2 µH or between 3.0 and 3.4 µH, or more preferably either between 1.4 and 1.8 µH or about 3.0 µH, if the input series inductance should be 2.8 µH for rendering the switching resonant frequency equal to the transformer resonant frequency. The converter output voltage is controlled by a control stage (51) for feeding the converter output voltage back to the switching stage to reduce an on-off switching frequency of the DC input signal with an increase in load.

20 Claims, 11 Drawing Sheets

CONVERTER COMPRISING A PIEZOELECTRIC TRANSFORMER AND A SWITCHING STAGE OF A RESONANT FREQUENCY DIFFERENT FROM THAT OF THE TRANSFORMER

BACKGROUND OF THE INVENTION

This invention relates to a switching or DC—DC converter comprising a piezoelectric transformer and, more particularly, to a switching converter having a high conversion efficiency.

In general, applicable to two main fields is a power source comprising a piezoelectric transformer. One is for use in producing a high tension power, such as at 1 kV and several milliamperes, as an inverter for supplying back light to a liquid crystal display. The other is for use in producing a low voltage power, such as at 5 volts and several amperes, as a DC—DC converter. For use in such a power source, it is desirable to use a piezoelectric transformer which is of a laminated type and is disclosed in U.S. Pat. No. 5,118,982 issued to Takeshi Inoue and two others, assignors to the present assignee. The specification of this Inoue et al United States patent is incorporated herein by reference.

In the inverter, an output voltage (in practice, an output current) of the piezoelectric transformer is controlled by using band-pass filter characteristics of the piezoelectric transformer by frequency modulation. More particularly, an input switching stage is used to have a switching frequency which is swept on both sides of a resonant frequency of the piezoelectric transformer. In general, the piezoelectric transformer is disadvantageous in that its efficiency is deteriorated when the switching frequency is widely different from the resonant frequency. This disadvantage, however, gives rise to no serious problem in the inverter because the output current is small, such as only 5 to 10 milliamperes. As a consequence, the frequency modulation achieves an effective control.

As for the DC—DC converter comprising the piezoelectric transformer of the laminated type, a small-sized one is available for high frequency use with a high efficiency. Development is therefore in progress towards fulfilment of requisite for a switching frequency in a megaherts band, such as 1 to 2 MHz, an input voltage of 80 volts, a 50-W output power (5 volts, 10 amperes), and a high efficiency of at least 80 percent.

It is insufficient in this connection for achievement of the switching converter merely to give a high transformer efficiency to the piezoelectric transformer. Instead, losses must be reduced by attaining excellent match between the piezoelectric transformer and its peripheral circuitry consisting of an input switching stage and an output rectifier stage.

For use as the DC—DC converter, a switching or power converter is revealed in a paper contributed by T. Zaitsu, the present inventor, and six others to the IEEE PESC94 proceedings, Jun. 1994, pages 585 to 589, under the title of "Piezoelectric Transformer Operating in Thickness Extensional Vibration and its Application to Switching Converter" and in another paper contributed by Toshiyuki Zaitsu, the present inventor, and three others to the IEEE Intelec. Proc. 1992, pages 430 to 436, under the title of "2 MHz Power Converter with Piezoelectric Ceramic Transformer". For each of these two Zaitsu et al papers, two of other contributors are joint inventors of the United States patent referred to above. In both of these papers, the piezoelectric transformer of the United States patent is described to a certain extent and is said to have an efficiency of 90 percent. In accordance with a first-cited one of the Zaitsu et al pepers, the converter has an efficiency of 75 and 83 percent when zero volt switching is used with half-bridge and full-bridge rectifier stages, respectively. According to a second-cited one, the converter has an efficiency of 52 percent when class E switching is resorted to.

In the manner which will later be described in greater detail, a switching converter comprises a piezoelectric transformer having a pair of transformer input terminals, an input capacitance between the transformer input terminals, and a transformer resonant frequency. Responsive to a transformer input signal supplied across the transformer input terminals, the piezoelectric transformer produces a transformer output signal. An input switching stage is used to supply the transformer input signal to the piezoelectric transformer. An output rectifier stage is supplied with the transformer output signal.

The input switching stage produces the transformer input signal in response to a converter input signal. Responsive to the transformer output signal, the output rectifier stage develops a converter output signal across a load resistor which terminates the output rectifier stage. When the switching converter is a DC—DC converter, the converter input and output signals have DC input and output powers. In any event, the switching converter has a power conversion efficiency as a converter efficiency defined by a ratio of the converter input power to the converter output power. Similarly, the piezoelectric transformer has a transformer efficiency defined by the transformer input and output signals.

The piezoelectric transformer has a pair of transformer output terminals connected to the output rectifier stage and an output capacitance between the transformer output terminals. The transformer input signal causes a circulating current to flow through the input and the output capacitances to give rise to a conduction loss. Such losses reduce the transformer efficiency. In conventional switching converters described in the two Zaitsu et al papers, the input switching and the output rectifier stages are used to reduce the circulating current. The transformer efficiency is thereby raised to 90 percent. The converter efficiency is still objectionable. In addition, it has been confirmed by the present sole inventor that the converter output signal undesiredly varies to adversely affect the converter efficiency when a variation or change is introduced into the load resistor.

SUMMARY OF THE INVENTION

It is consequently an object of the present invention to provide a switching converter which comprises a piezoelectric transformer, an input switching stage, and an output rectifier stage and which has a high converter efficiency, such as 80 percent or higher.

It is another object of this invention to provide a switching converter which is of the type described and which has the high converter efficiency with no objection.

It is still another object of this invention to provide a switching converter which is of the type described and which is capable of keeping the high converter efficiency of at least 80 percent regardless of a variation in a load resistor terminating the output rectifier stage.

It is yet another object of this invention to provide a switching converter which is of the type described and which is capable of keeping a converter output voltage constant regardless of a variation in the load resistor.

Other objects of this invention will become clear as the description proceeds.

In accordance with this invention, there is provided a switching converter comprising a piezoelectric transformer having a pair of transformer input terminals, an input capacitance between the transformer input terminals, and a transformer resonant frequency and responsive to a transformer input signal for producing a transformer output signal, an input switching stage for supplying the transformer input signal to the piezoelectric transformer, and an output rectifier stage supplied with the transformer output signal, wherein: (A) the switching stage includes an input series inductor of an input series inductance connected in series to one of the transformer input terminals to define a switching resonant frequency in cooperation with the input capacitance; (B) the switching resonant frequency being different from the transformer resonant frequency.

DESCRIPTION OF THE PREFERRED EMBODIMENT

Figure 1:
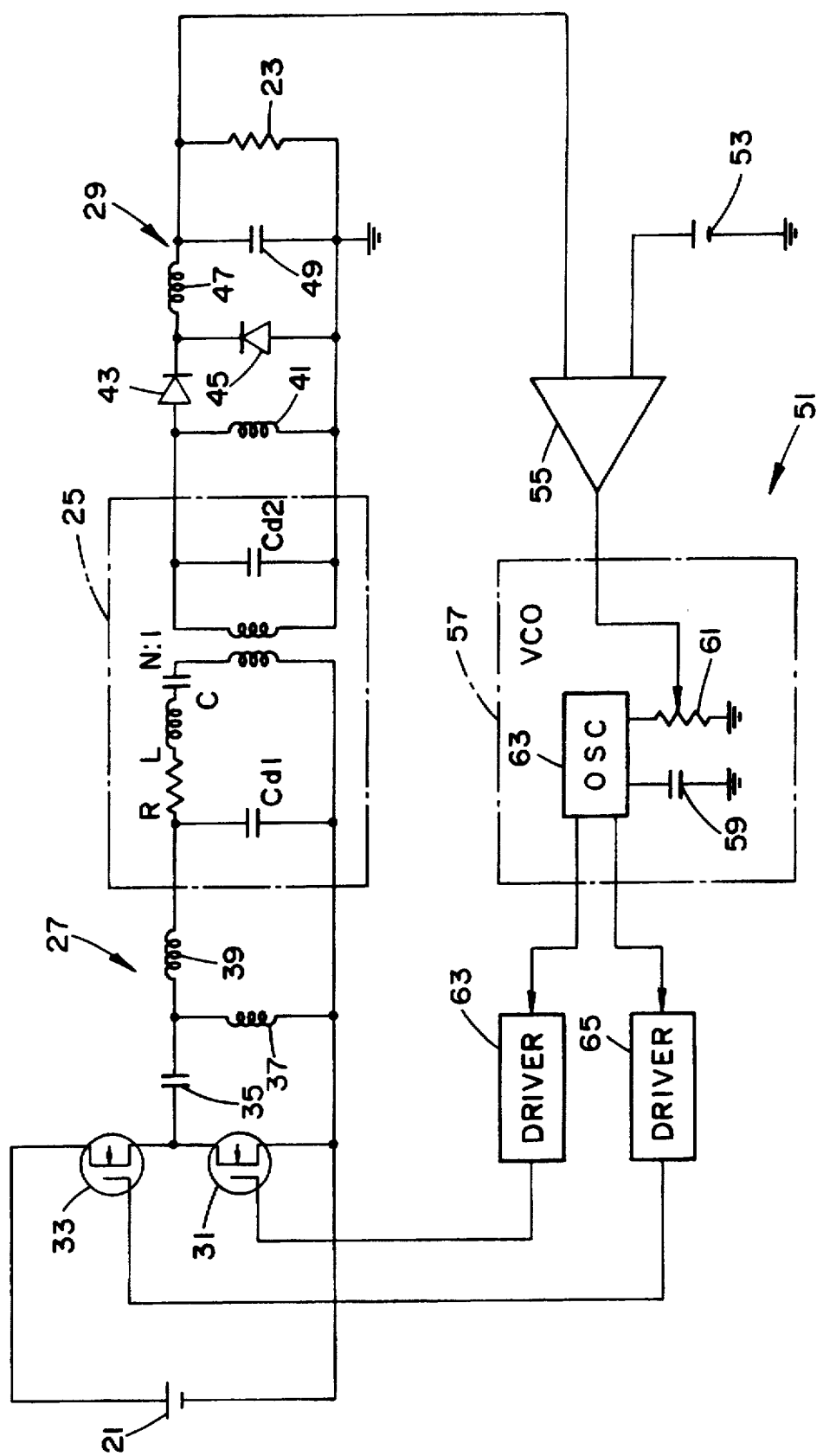
FIG. 1 is a circuit diagram of a switching converter according to an embodiment of the instant invention with a part depicted as an equivalent circuit.
Figure 11:
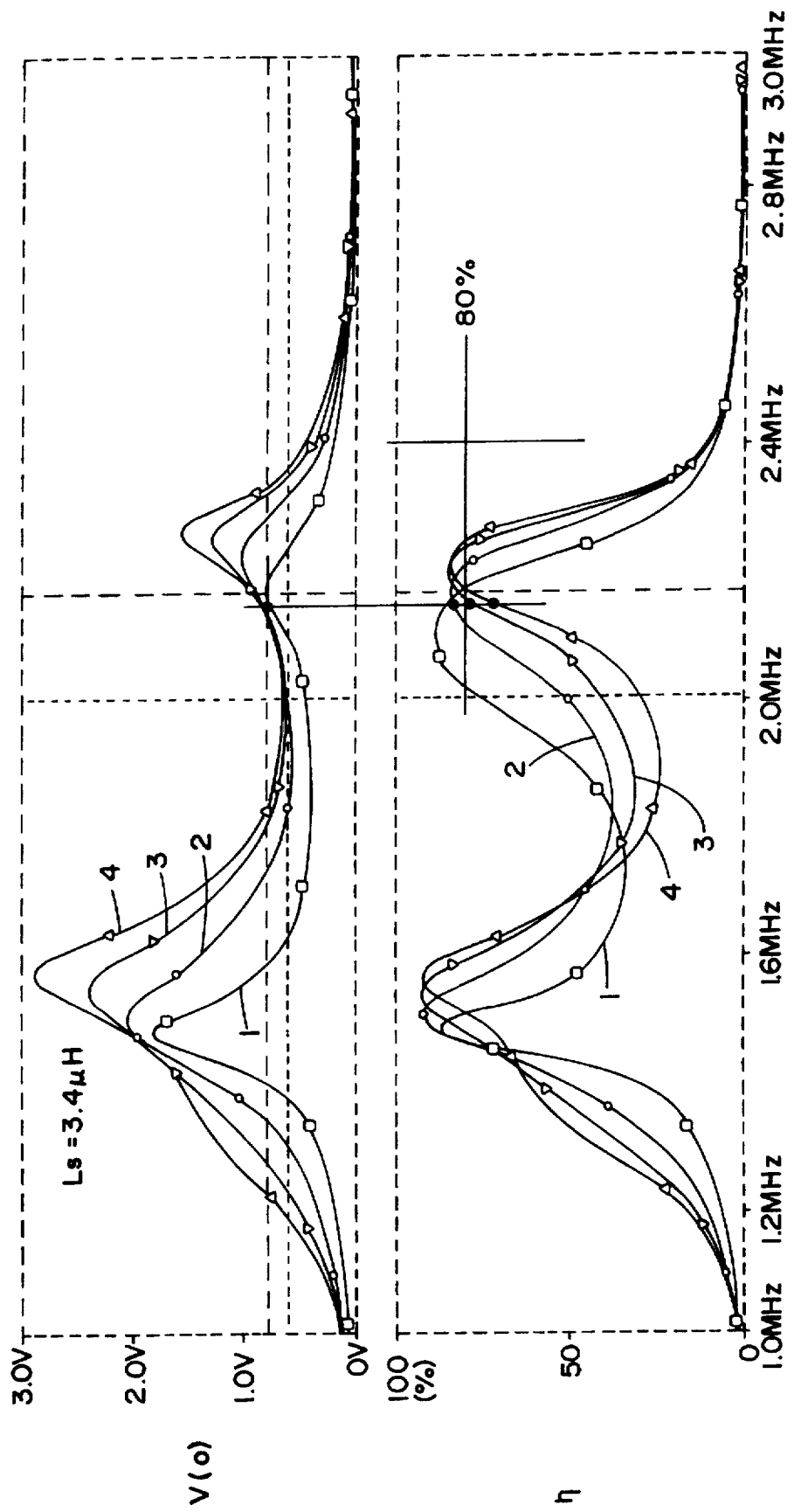
Figure 12:
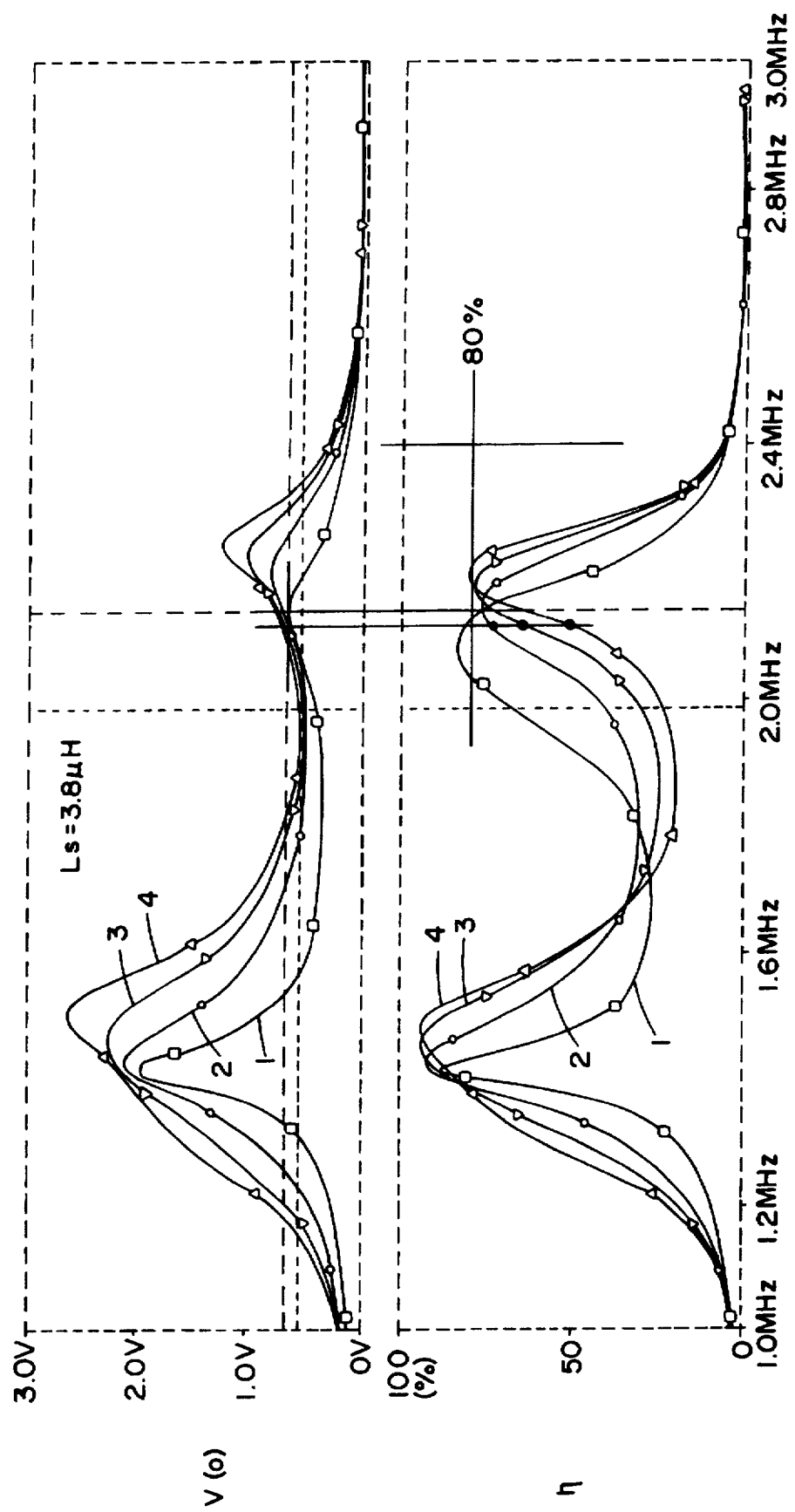

Referring to FIG. 1 illustrative of a switching or DC—DC converter according to a preferred embodiment of the present invention, a conventional switching converter will first be described in order to facilitate an understanding of this invention. The conventional switching converter is similar to the switching converter described with reference to FIG. 11 of the first-cited one of the Zaitsu et al papers referred to hereinabove as a PT converter using ZVS with full-bridge rectifier.

Responsive to a converter input signal supplied between a pair of converter input terminals with a converter input voltage V(1), such a switching converter produces in general a converter output signal of a converter output voltage V(o) across a pair of converter output terminals. The converter input and output voltages are typically substantially DC voltages.

In the example being illustrated, the converter input signal is supplied by an input power source 21. The converter output signal is developed across a load resistor 23 of a load resistance R(L) terminating the switching converter at the converter output terminals.

The switching converter comprises a piezoelectric transformer 25 which is depicted as a lumped-constant equivalent circuit of a transformer internal resistance R, a transformer inductance L, a transformer capacitance C, and an element transformer indicated by its turn ratio of N:1 and is operable preferably in a thickness extensional vibration mode described in the Inoue et al United States patent referred to hereinabove and which has a pair of transformer input terminals and a pair of transformer output terminals as will become clear as the description proceeds. Having substantially DC voltages, the transformer input and output signals will be denoted by V1 and V2.

In the equivalent circuit, the piezoelectric transformer 25 has input and output capacitances Cd1 and Cd2 between the transformer input terminals and between the transformer output terminals. The piezoelectric transformer 25 is operable typically at 20 W and has a transformer resonant frequency f(0) which is, for example, about 2.0 MHz.

An input switching stage 27 is supplied with the converter input signal by the input power source 21 to supply the transformer input signal to the transformer input terminals. An output rectifier stage 29 is supplied with the transformer output signal from the transformer output terminals to develop the converter output signal across the load resistor 23.

In the input switching stage 27, first and second field effect transistors 31 and 33 are connected in series between the converter input terminals and are alternatingly switched on with a dead time t(d) interposed between two consecutive instances of switch on to be operable As a zero volt switching (ZVS) circuit for producing, in response to the converter input signal, first and second sequences of transistor output pulses with a time interval of zero voltage left in correspondence to the dead time between two adjacent ones of the transistor output pulses of the first and the second sequences. An input series capacitor 35 of an input series capacitance C(B) is connected to a point of a series connection between the first and the second field effect transistors 31 and 33. An input parallel inductor 37 of an input parallel inductance L(r) is connected across a series connection of the input series capacitor 35 and one of the first and the second field effect transistors 31 and 33 that is the first field effect transistor 31 in the illustrated example. The input parallel inductor 37 is called a resonant inductor in the first-cited one of the Zaitsu et al papers. In cooperation with the zero volt switching circuit (31, 33), a combination of the input series capacitor and parallel inductor 35 and 37 produces a quasi-rectangular signal V(Lr) across the input parallel inductor 37 in response to the converter input signal In the conventional switching converter, the input switching stage 27 comprises an input series inductor 39 of an input series inductance L(s) between a point of connection of the input series capacitor and parallel inductor 35 and 37 and one of the transformer input terminals that may be whichever of the transformer input terminals. The input series inductor 39 is for use in converting the quasi-rectangular signal to a substantially sinusoidal signal in cooperation with an input part of the piezoelectric transformer 25 for use as the transformer input signal.

In the piezoelectric transformer 25, the input switching stage 27 produces a circulating current which flows into the input and the output capacitances to undesiredly give rise to a conduction loss. It has consequently been the practice in a conventional switching stage 27 operable in the zero volt switching to make the input series inductance define the transformer resonant frequency in cooperation with the input capacitance.

In the switching converter according to this invention, the input switching stage 27 comprises also an input series inductor 39 of an input series inductance L(s'). Although used in cooperation with the input capacitance in converting the quasi-rectangular signal to a substantially sinusoidal transformer input signal, this input series inductor 39 is considerably different from that used in the conventional switching stage 27 in the manner which will presently be described.

The output rectifier stage 29 comprises an output parallel inductor 41 of an output parallel inductance L(p) which defines the transformer resonant frequency in cooperation with the output capacitance to reduce the circulating current. In the illustrated example, the output rectifier stage 29 serves as a half-bridge rectifier and comprises first and second rectifiers 43 and 45, such as Shottkey diodes according to the second-cited one of the Zaitsu et al papers, and smoothing inductor and capacitor 47 and 49. With respect to the output rectifier stage 29 which may be the full-bridge rectifier, the switching converter of this invention is substantially identical with the conventional switching converter except that the output rectifier stage 29 is grounded in the example being illustrated.

Figure 2:
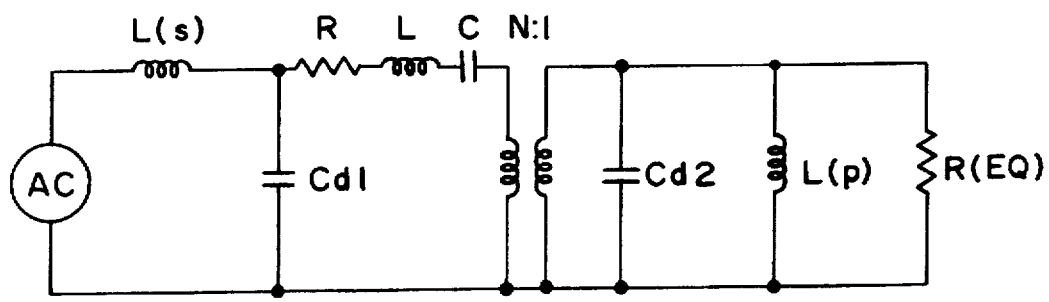
FIG. 2 shows an equivalent circuit of a principal part of the switching converter illustrated in FIG. 1.

Turning temporarily to FIG. 2, an equivalent circuit is for use in simulating frequency characteristics of the conventional switching converter and of a principal part so far described in conjunction with the switching converter of this invention with reference to FIG. 1. The quasi-rectangular signal is little dependent on variations in frequency and load and is therefore deemed as produced by an alternating-current source AC. In the output rectifier stage 29, input and output of a rectifying and smoothing circuit (43–49) are in phase coincidence. A combination of the load resistor 23 and the rectifying and smoothing circuit is consequently represented by an equivalent resistance R(EQ) which is equal to $(\pi^2/2)R(L)$ as given by Equation (11) of the first-cited one of the Zaitsu et al papers.

The input switching stage 27 is herein said to have a switching resonant frequency f(R) in cooperation with the input capacitance. More in detail, the input series inductor 39 defines the switching resonant frequency in cooperation with the input capacitance. In the manner described in the foregoing, the input series inductance L(s) defines in this manner the transformer resonant frequency in the conventional switching converter provided that the input switching stage 27 is operable in the zero volt switching. The output parallel inductance defines the transformer resonant frequency in cooperation with the output capacitance as given by Equation (7) of the first-cited one of the Zaitsu et al papers. As a consequence:

$$L(s)=1/(\omega^2(0)Cd1) \quad (1)$$

and $$L(p)=1/(\omega^2(0)Cd2), \quad (2)$$

where ω(0) represents the transformer resonant frequency in angular frequency.

In an example of the piezoelectric transformer 25, the turn ratio is equal to 2:1. Circuit constants have following values.

Cd1:2600 pF,
Cd2:9522 pF,
R:2.96 ohms,
L:23 μH,
and
C:318 pF.

With these values, the transformer resonant frequency is equal to 1.86 MHz. Using this transformer resonant frequency in Equations (1) and (2), the input series inductance of the conventional switching stage 27 and the output parallel inductance are equal to 2.8 μH and 0.77. μH, respectively.

Using FIGS. 1 and 2, operation of the input switching stage 27 and the piezoelectric transformer 25 will be described more in detail. By an exciting current flowing through the input parallel inductor 37, the zero volt switching circuit charges and discharges parasitic capacitances of the first and the second field effect transistors 31 and 33 during the dead times to develop the quasi-rectangular signal across the input parallel inductor 37. The combination of the input series inductance and the input capacitance transforms the quasi-rectangular signal into the substantially sinusoidal transformer input signal, which is filtered by the transformer inductance and capacitance and then subjected to voltage increase or descrease by the elementary transformer into the transformer output signal.

Turning back to FIG. 1, the switching converter of this invention comprises a control stage 51 responsive to a difference voltage between the converter output voltage V(o) and a reference voltage V(REF) for controlling the switching resonant frequency to keep the converter output signal constant regardless of a variation or change in the load resistor 23. In the illustrated example, the reference voltage is supplied by a voltage source 53 relative to ground.

In the control stage 51, an amplifier 55 is supplied with the converter output signal and the reference voltage and produces the difference voltage. Responsive to the difference voltage, a voltage controlled oscillator (VCO) 57 generates a voltage controlled oscillation signal of an oscillation frequency which is variable in a range including the switching resonant frequency. In the manner known in the art, the voltage controlled oscillator 57 comprises an oscillator capacitor 59, a variable resistor 61 controlled by the difference voltage, and an oscillator 63 which is controlled by the oscillator capacitor 59 and the variable resistor 61 to produce two components of the voltage controlled oscillation signal in phase opposition. Responsive to these two components, first and second drivers 65 and 67 deliver pulses of first and second gate control signals to gate electrodes of the first and the second field effect transistors 31 and 33.

Figure 3:
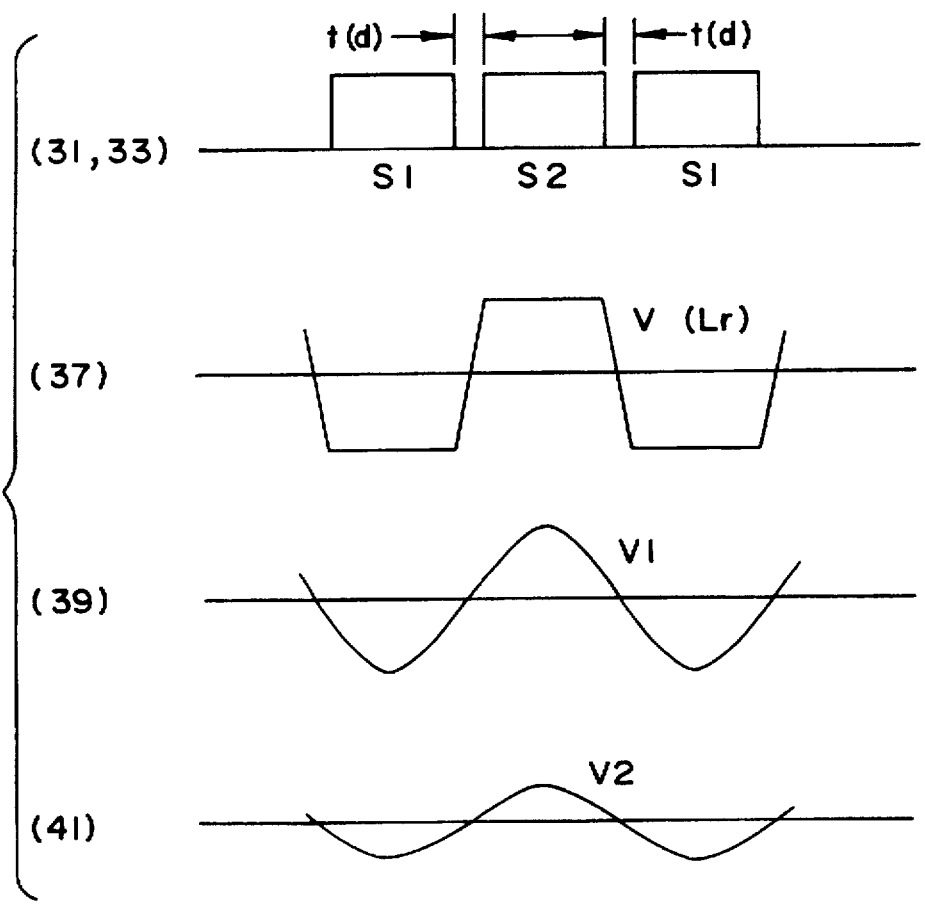
FIG. 3 schematically shows several waveforms at various points of the switching converter depicted in FIG. 1.

Turning to FIG. 3 with FIG. 1 continuously referred to, the pulses of the first and the second gate control signals are delivered to the first and the second field effect transistors 31 and 33 in the manner exemplified at S1 and S2 along a first or top row labelled (31, 33). The dead time t(d) is interposed between two consecutive ones of the pulses of the first and the second gate control signals. Varying between plus E/2 and minus E/2, where E depends primarily on the converter input voltage V(i), the quasi-rectangular signal V(Lr) is developed across the input parallel inductor 37 as depicted along a second row labeled (37). Responsive to the quasi-rectangular signal, the substantially sinusoidal transformer input signal V1 of an amplitude (4/π)E/2 is supplied through the input series inductor 39 to the piezoelectric transformer 25 as depicted along a third row labeled (39). The piezoelectric transformer 25 produces the transformer output signal V2 across the output parallel inductor 41 as depicted along a fourth or bottom row labeled (41). The transformer output signal is substantially equal to V1/N.

In the manner described before, the switching resonant frequency is different according to this invention from the transformer resonant frequency. It should be noted in connection with an input switching stage 27 operable as described in the second-cited one of the Zaitsu et al papers in the class E switching that the switching resonant frequency should be slightly higher than the transformer resonant frequency, being 2.1 MHz when the transformer resonant frequency is equal to 2.0 MHz. The switching resonant frequency is, however, different from the transformer resonant frequency in accordance with this invention regardless of whether the input switching stage 27 is operable in the zero volt switching or in the class E switching. Even for the input switching stage 27 operable in the zero volt switching, the switching resonant frequency should be higher or lower than the transformer resonant frequency. For example, the input series inductance L(s') may be equal either to 0.65 L(s) or to 1.2 L(s).

In the manner which is described hereinabove and will later be described in detail, it has been confirmed by the present inventor that the converter efficiency and the converter output signal are adversely affected by the variation which takes place in the load resistor 23. More particularly, the switching converter is used in supplying various loads with the converter output signal developed across such loads, each of which is used as the load resistor 23. Even in a single load, its internal resistance may vary from time to time depending on the circumstances. It is therefore very important to keep the converter output signal and the converter efficiency constant even if a variation may appear in the load resistor 23.

It is known as described hereinabove in connection with the inverter for the high-tension converter output signal to use the band-pass filter characteristics of the piezoelectric transformer 25 and to sweep the switching frequency, rather than the switching resonant frequency, on keeping the converter output signal constant against the variation in the load resistor 23. Dependency of the converter output signal and the converter efficiency on the variation in the load wiill now be studied more in detail. For clarity of the description, attention will be directed to a normalized resistance r(s) which is the equivalent resistance normalised by a matching resistance R(EQM) given by $1/(\omega(0)Cd2)$. Namely:

$$r(s) = R(EQ)/R(EQM)$$
$$= \pi^2 \omega(O)R(L)Cd2/2$$

Figure 4:
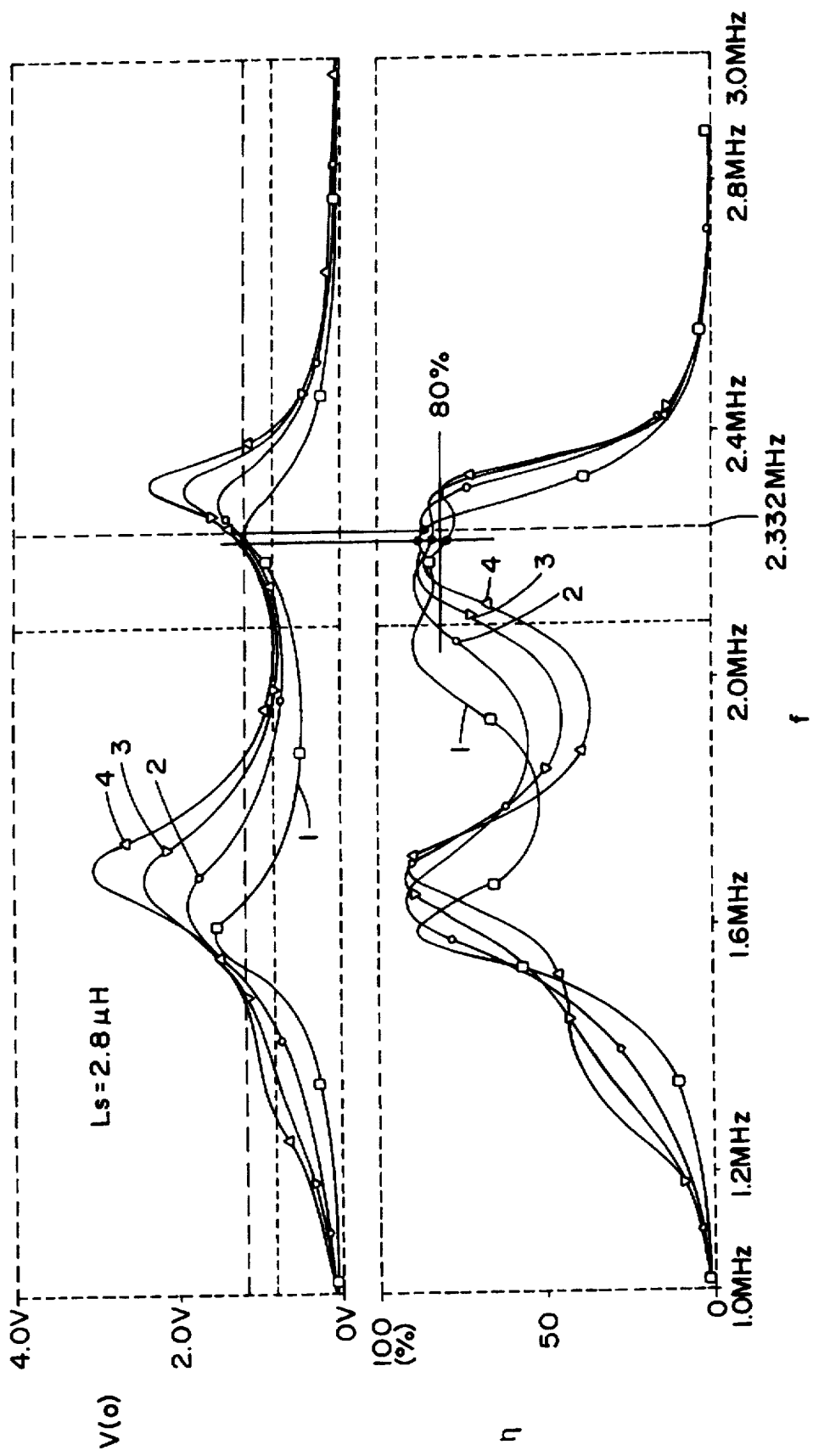
FIG. 4 schematically shows frequency characteristics of a conventional switching converter.
Figure 5:
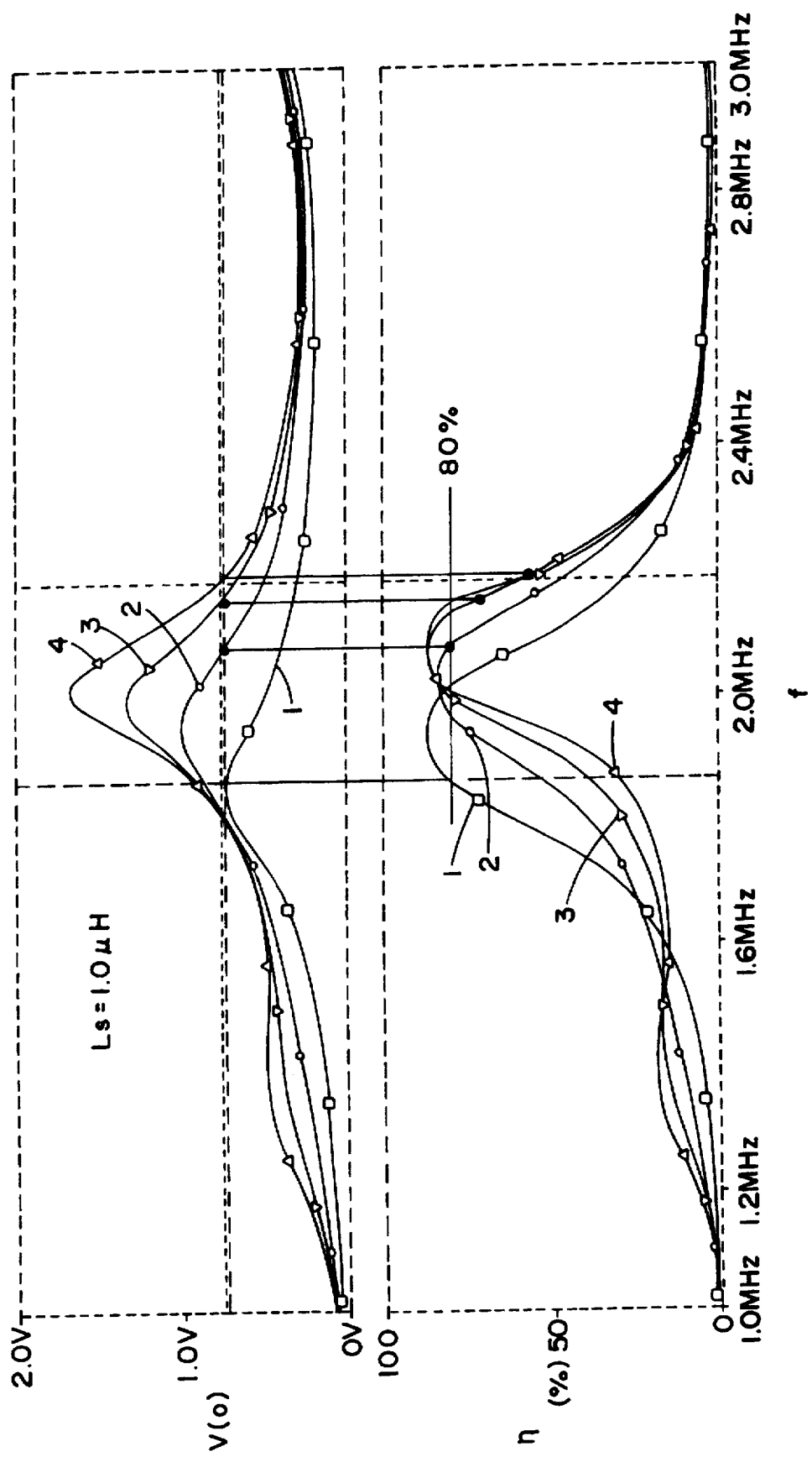
FIGS. 5 to 12 are schematic illustrations of frequency characteristics for various: input series inductances used in the principal parts mentioned in connection with FIG. 2.
Figure 6:
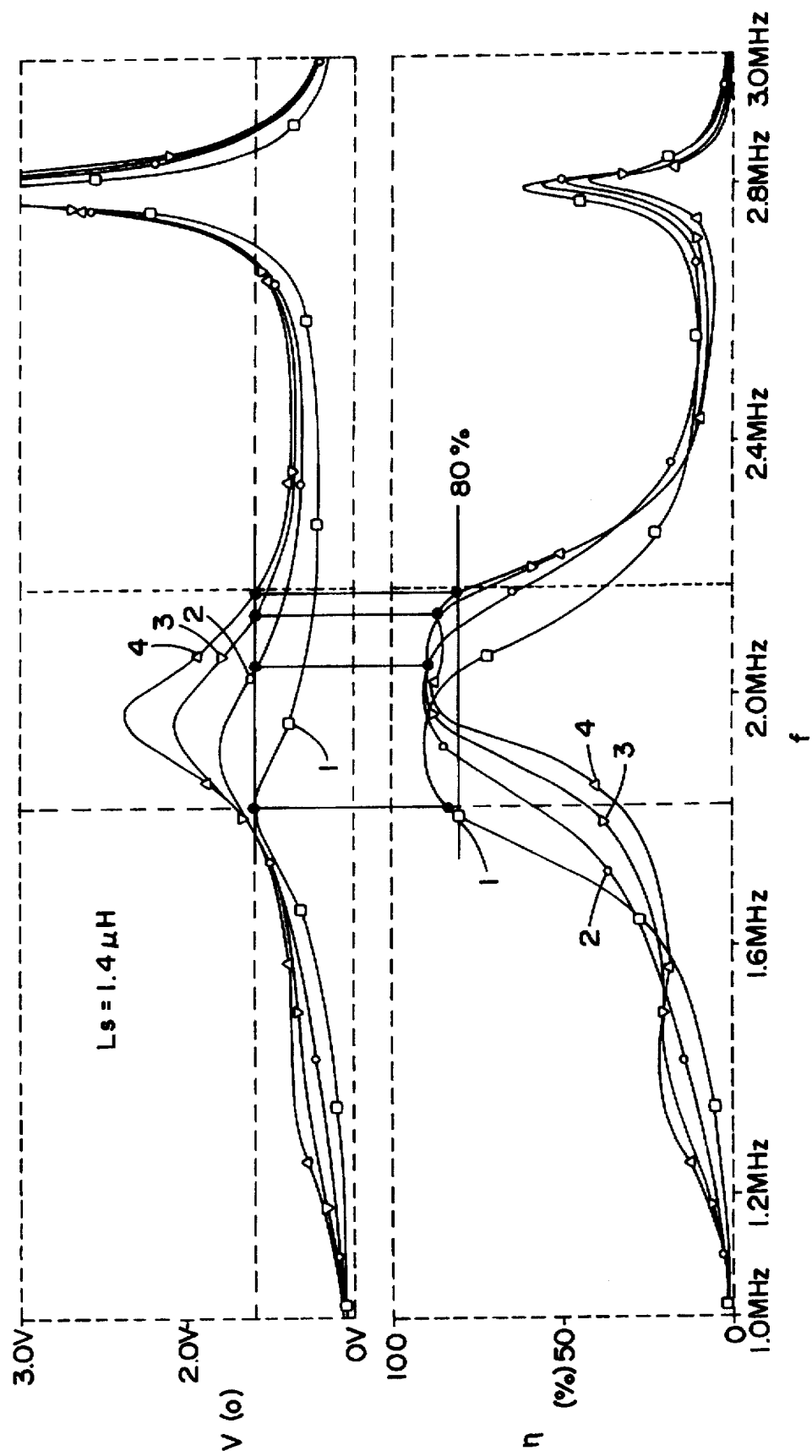
Figure 7:
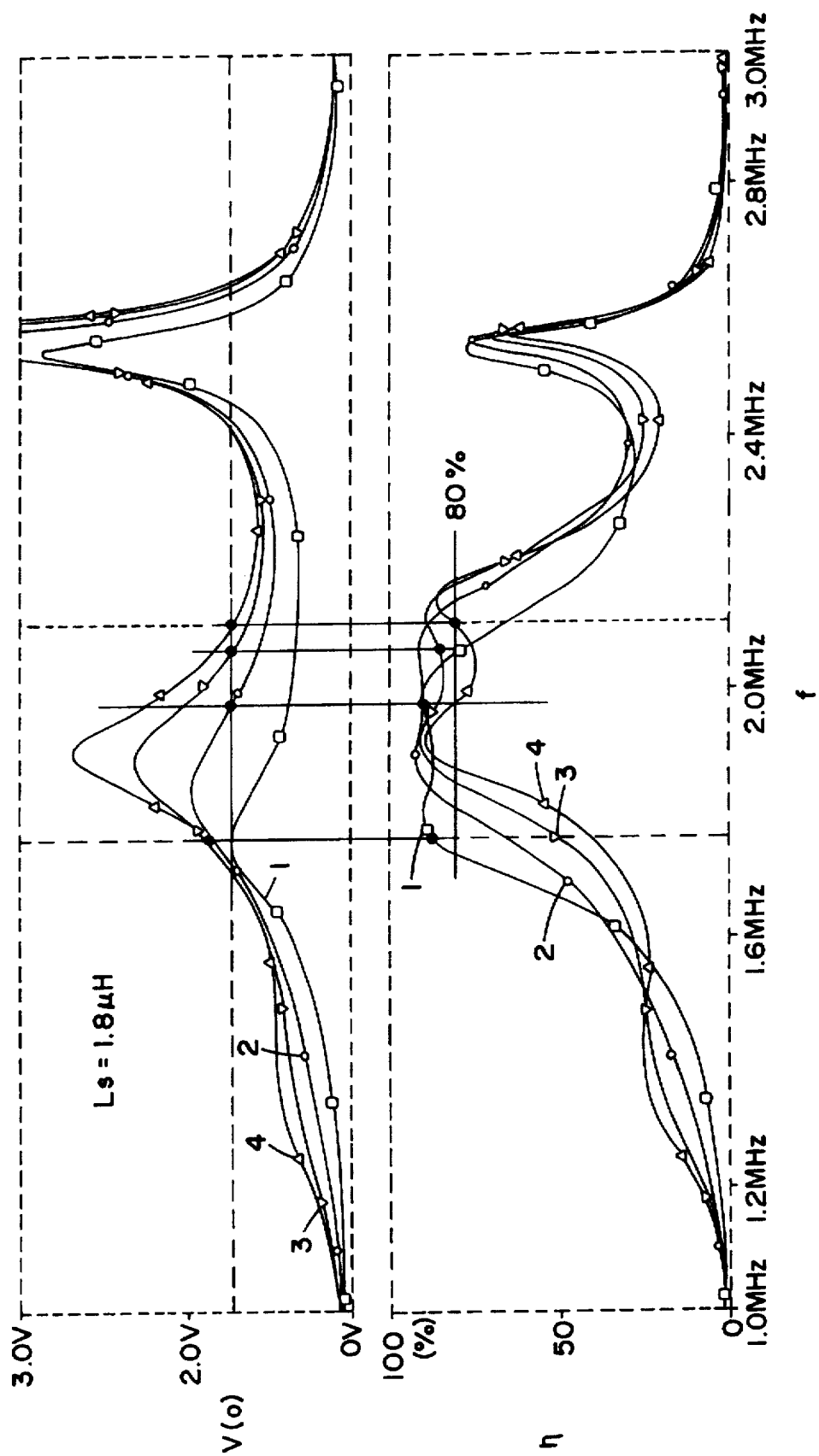
Figure 8:
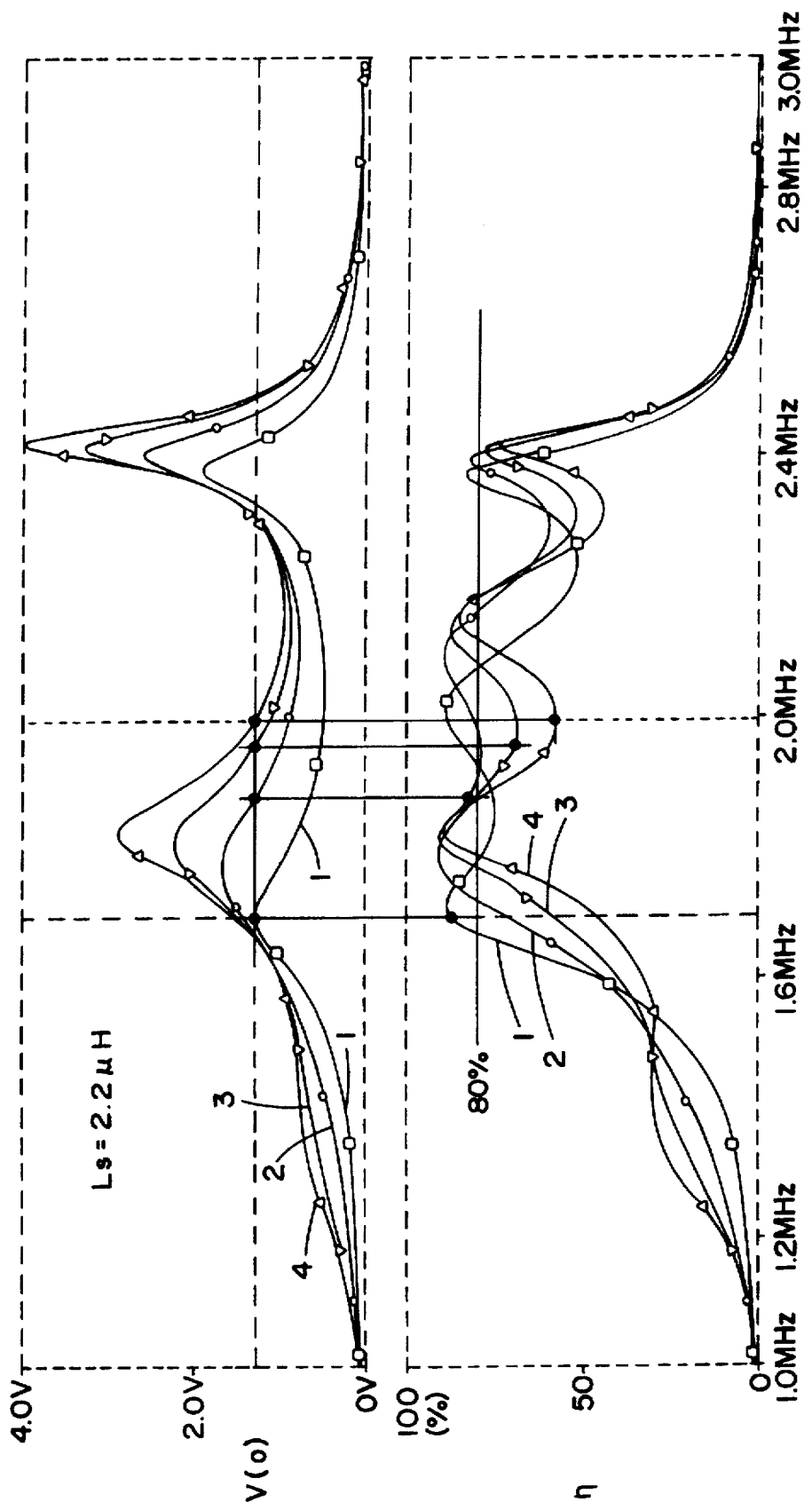
Figure 9:
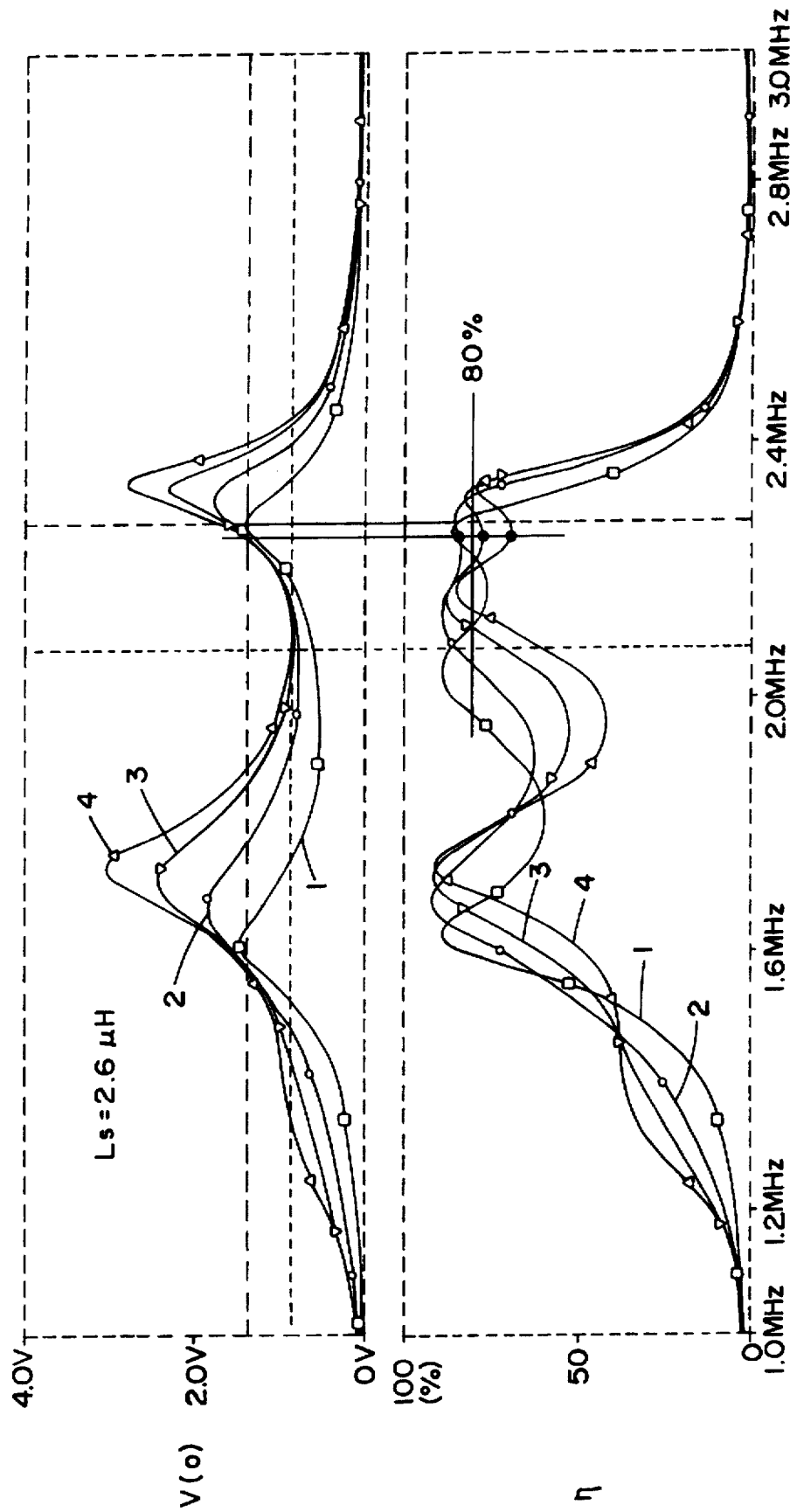
Figure 10:
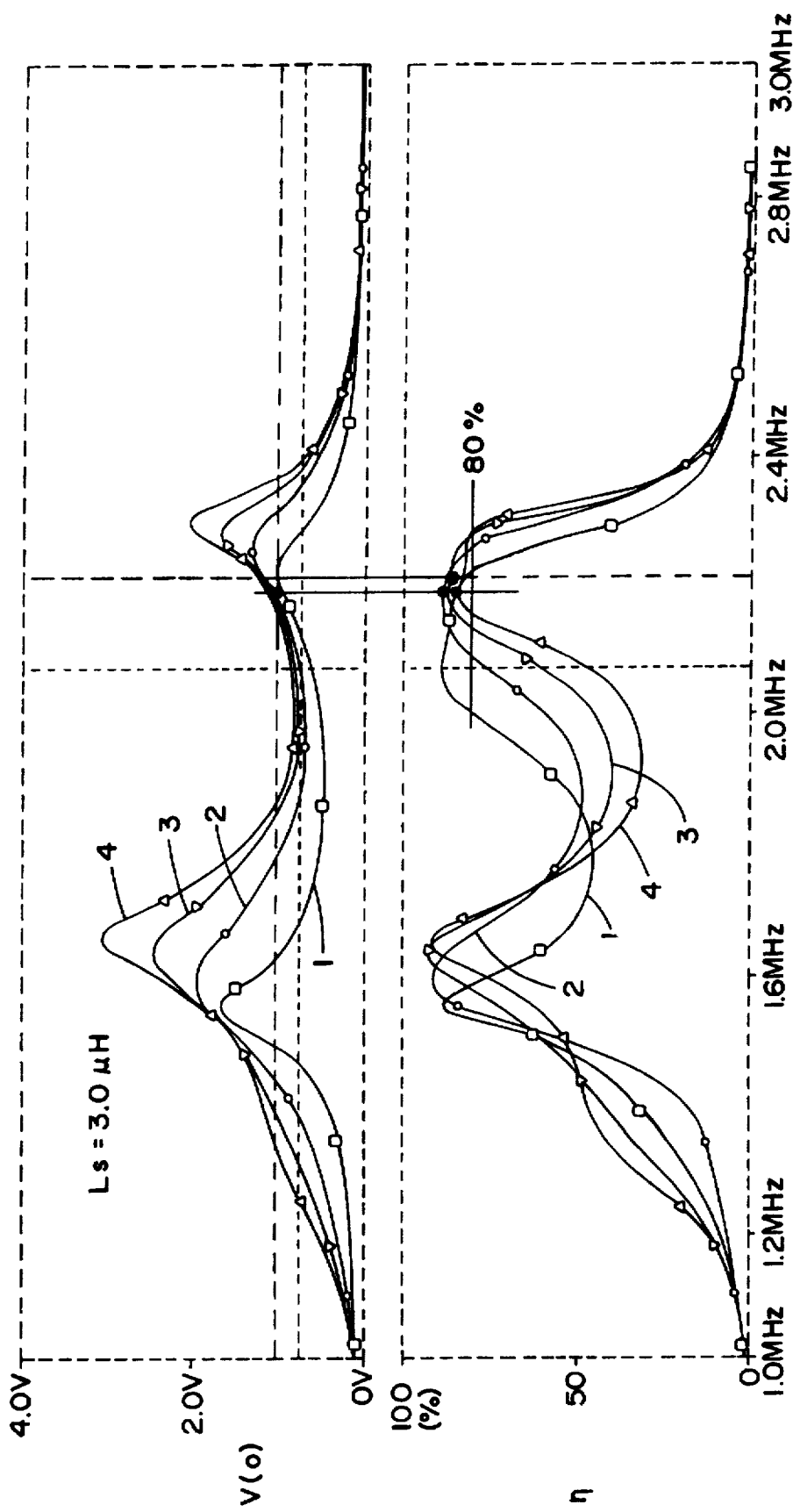

Referring afresh to FIG. 4 and again to FIG. 1, computer simulation was used to plot the converter output voltage V(o) and the converter efficiency, denoted by π, against the switching frequency, represented by f, upwardly and downwardly of the drawing figure. On using the computer simulation, the normalised resistance r(s) was used as a parameter and is indicated by 1 through 4 along curves representative of the characteristics with 1, 2, 3, and 4 selected as the normalized resistance.

The curves were obtained in connection with the conventional switching converter described in the foregoing for the input series inductance L(s) of 2.8 µH. This value is described above and was selected in order to attain a predetermined output voltage indicated by a horizontal dashed line with a maximum probable normalized resistance of 4 and at a certain frequency which was 2.332 MHz. The converter efficiency was above 80 percent when the normalized resistance was between 1 and 3, both inclusive. The converter efficiency, however, descreased below 80 percent when the normalized resistance was 4.

Referring now to FIGS. 5 through 12 with FIG. 1 continuously referred to, the computer simulation was applied to the principal part of switching converters according to this invention. The input series inductance L(s') was varied from 1.0 µH to 3.8 µH with a step of 0.4 µH. The predetermined output voltage is again indicated in each of these figures by a horizontal dashed line. Throughout FIGS. 4 through 12, the input series inductance is denoted by Ls in common to L(s) and L(s'). The input series inductance was 1.0 µH in FIG. 5, 1.4 µH in FIG. 6, 1.8 µH in FIG. 7, 2.2 µH in FIG. 8, 2.6 µH in FIG. 9, 3.0 µH in FIG. 10, 3.4 µH in FIG. 11, and 3.8 µH in FIG. 12.

Observing these figures, it is understood in connection with the zero volt switching that the converter efficiency of 80 percent was achieved for the normalised resistance of 1 through 4 when the input series inductance was between 1.0 and 2.2 µH and between 3.0 and 3.4 µH, namely, between 0.36 L(s) and 0.78 L(s) and between 1.1 L(s) and 1.2 L(s) although it is natural that the converter output voltage went below the predetermined output voltage when the normalized resistance was 1. Preferred ranges of the input series inductance were between 1.4 µH and 1.8 µH and about 3.0 µH, namely, between 0.50 L(s) and 0.64 L(s) and about 1.1 L(s). It should be noted in this connection that the input series inductor 39 should preferably have a small inductance with a view to reducing its internal resistance. Incidentally, the computer simulation showed little dependency of the converter efficiency and the converter output voltage on the output parallel inductance L(p).

On controlling the converter output voltage, it is preferred to feedback to converter output signal to the zero volt switching circuit (31, 33) so as to reduce the switching frequency lower when the load resistance grows greater. The control stage 51 is therefore useful. It should be noted that the switching resonant frequency f(R) be slightly higher than the transformer resonant frequency f(o) when the class E switching is resorted to.

What is claimed is:

1. A switching converter comprising a piezoelectric transformer having a pair of transformer input terminals, an input capacitance between said transformer input terminals, and a transformer resonant frequency and responsive to a transformer input signal for producing a transformer output signal, an input switching stage for supplying said transformer input signal to said piezoelectric transformer, and an output rectifier stage supplied with said transformer output signal, wherein:

said input switching stage includes an input series inductor of an input series inductance connected in series to one of said transformer input terminals to define a switching resonant frequency in cooperation with said input capacitance; and said output rectifier stare includes an output parallel inductor of an output parallel inductance connected in parallel between transformer output terminals of said transformer to define said transformer resonant frequency in cooperation with an output capacitance connected between said transformer output terminals;

said switching resonant frequency being different from said transformer resonant frequency.

2. A switching converter as claimed in claim 1, said switching stage being operable in zero volt switching, wherein said switching resonant frequency is higher than said transformer resonant frequency.

3. A switching converter as claimed in claim 2, wherein said input series inductance is from 0.36 to 0.78 times another input series inductance that defines another switching resonant frequency in cooperation with said input capacitance to be equal to said transformer resonant frequency.

4. A switching converter as claimed in claim 2, wherein said input series inductance is from 0.55 to 0.64 times another input series inductance that defines said transformer resonant frequency in cooperation with said input capacitance.

5. A switching converter as claimed in claim 1, said switching stage being operable in zero volt switching, wherein said switching resonant frequency is lower than said transformer resonant frequency.

6. A switching converter as claimed in claim 5, wherein said input series inductance is from 1.1 to 1.2 times another input series inductance that defines another switching resonant frequency in cooperation with said input capacitance to be equal to said transformer resonant frequency.

7. A switching converter as claimed in claim 5, wherein said input series inductance is about 1.1 times another input series inductance that defines said transformer resonant frequency in cooperation with said input capacitance.

8. A switching converter as claimed in claim 1, said switching stage being operable in class E switching, wherein said switching resonant frequency is higher than said transformer resonant frequency.

9. A switching converter as claimed in claim 1, said rectifier stage having a pair of converter output terminals between which a load resistor is connected to develop a converter output voltage, further comprising a control stage responsive to a difference voltage betwveen said converter output voltage and a reference voltage for controlling said switching resonant frequency to keep said converter output voltage constant regardless of a variation in said load resistor.

10. A switching converter as claimed in claim 9, said switching stage being operable in zero volt switching, wherein said switching resonant frequency is higher than said transformer resonant frequency.

11. A switching converter as claimed in claim 10, wherein said input series inductance is from 0.36 to 0.78 times another input series inductance that defines another switching resonant frequency in cooperation with said input capacitance to be equal to said transformer resonant frequency.

12. A switching converter as claimed in claim 10, wherein said input series inductance is from 0.50 to 0.64 times another input series inductance that defines said transformer resonant frequency in cooperation with said input capacitance.

13. A switching converter as claimed in claim 9, said switching stage being operable in zero volt switching, wherein said switching resonant frequency is lower than said transformer resonant frequency.

14. A switching converter as claimed in claim 13, wherein said input series inductance is from 1.1 to 1.2 times another input series inductance that defines another switching resonant frequency in cooperation with said input capacitance to be equal to said transformer resonant frequency.

15. A switching converter as claimed in claim 13, wherein said input series inductance is about 1.1 times another input series inductance that defines said transformer resonant frequency in cooperation with said input capacitance.

16. A switching converter as claimed in claim 9, said switching stage being operable in class E switching, wherein said switching resonant frequency is higher than said transformer resonant frequency.

17. A switching converter as claimed in claim 9, said switching stage comprising first and second field effect transistors connected in series and producing first and secoond sequences of transistor output pulses and a shaping circuit for shaping said first sequence of transistor output pulses into a quasi-rectangular signal, wherein:

said input series inductor is connected in series to said shaping circuit and said one of transformer input terminals to produce in response to said quasi-rectangular signal said transformer input signal with a sinusoidal waveform relative to the other of said transformer input teminals;

said control stage comprising:

an amplifier responsive to said converter output voltage and said reference voltage for producing said difference voltage;

a voltage controlled oscillator responsive to said difference voltage for producing a voltage controlled oscillation signal; and first and second drivers responsive to said voltage controlled oscillation signal for on-off switching said first and said second field effect transistors, respectively, to control said switching resonant frequency.

18. A switching converter as claimed in claim 17, said switching stage being operable in zero volt switching, wherein said input series inductance is from 0.36 to 0.78 times another input series inductance that defines another switching resonant frequency in cooperation with said input capacitance to be equal to said transformer resonant frequency.

19. A switching converter as claimed in claim 17, said switching stage being operable in zero volt switching, wherein said input series inductance is from 0.50 to 0.64 times another input series inductance that defines said transformer resonant frequency in cooperation with said input capacitance.

20. A switching converter as claimed in claim 17, said switching stage being operable in zero volt switching, wherein said input series inductance is about 1.1 times another series input inductance that defines another switching resonant frequnency in cooperation with said input capacitance to be equal to said transformer resonant frequency.

* * * * *

UNITED STATES PATENT AND TRADEMARK OFFICE
CERTIFICATE OF CORRECTION

PATENT NO. : 5,768,111
DATED : June 16, 1998
INVENTOR(S) : Toshiyuki Zaitsu

It is certified that error appears in the above-identified patent and that said Letters Patent is hereby corrected as shown below:

On The Title Page, [57] ABSTRACT: "frequeney" should read --frequency--

Column 3, Line 46, "V(1)" should read --V(i)--

Column 4, Line 18: "As" should read --as--

Column 4, Line 38-39: "signal In the-.." should read --signal.--

Column 8, Line 39, Claim 1: "stare" should read --stage--

Column 9, Line 16, Claim 9: "betwween" should read --between--

Column 10, Line 6, Claim 17: "secoond" should read --second--

Column 10, Line 15, Claim 17: "teminals" should read --terminals--

Column 10, Line 46, Claim 20: "frequnency" should read --frequency--

Signed and Sealed this

Fifth Day of September, 2000

Attest:

Q. TODD DICKINSON

Attesting Officer

Director of Patents and Trademarks